United States Patent
Parker et al.

(10) Patent No.: US 7,044,057 B2
(45) Date of Patent: May 16, 2006

(54) FABRICATION OF PRINTED DINING PLATES

(76) Inventors: Mary Louise Parker, 1855 Laurel Ridge Dr., Nashville, TN (US) 37215; Anthony Paolino, 10 Vincent Way, Franklin, MA (US) 02038; Bud Damiano, 68 Oakmont Ave., Westminster, MA (US) 01473; Tracy Wolf, 5N 895 Beaver Ct., St. Charles, IL (US) 60175

( * ) Notice: Subject to any disclaimer, the term of this patent is extended or adjusted under 35 U.S.C. 154(b) by 0 days.

(21) Appl. No.: 10/747,417

(22) Filed: Dec. 29, 2003

(65) Prior Publication Data

US 2004/0217508 A1 Nov. 4, 2004

Related U.S. Application Data

(60) Provisional application No. 60/438,646, filed on Jan. 8, 2003.

(51) Int. Cl.
*B29C 51/00* (2006.01)
*B29C 51/42* (2006.01)

(52) U.S. Cl. ............ 101/483; 264/129; 264/132; 264/526; 264/519; 264/521; 101/487; 101/488

(58) Field of Classification Search ............ 264/132, 264/519–574
See application file for complete search history.

(56) References Cited

U.S. PATENT DOCUMENTS

| 4,302,235 A | | 11/1981 | Luers |
| 5,386,301 A | * | 1/1995 | Yuasa et al. ............ 358/445 |
| 6,353,772 B1 | | 3/2002 | Silverbrook |
| 6,529,686 B1 | | 3/2003 | Ramanan et al. |
| 6,544,368 B1 | * | 4/2003 | Yates ................ 156/230 |
| 6,696,007 B1 | * | 2/2004 | D'Addario et al. ....... 264/322 |
| 6,699,629 B1 | * | 3/2004 | Helber et al. ............ 430/22 |

FOREIGN PATENT DOCUMENTS

| FR | 2784619 A1 | * | 4/2000 |
| GB | 2205063 A | * | 11/1988 |
| JP | 60004020 A | * | 1/1985 |

* cited by examiner

*Primary Examiner*—Daniel J. Colilla
(74) *Attorney, Agent, or Firm*—Dickstein, Shapiro, Morin & Oshinsky, LLP.

(57) ABSTRACT

A method of fabricating a formed object, comprising the steps of printing a desired high quality photo or near photo like image on a forming material at a resolution substantially equal to the resolution of an original digital image used to form the high quality image, and forming the formed object by a forming process in which the temperature and pressure across the object are varied.

24 Claims, 5 Drawing Sheets

FABRICATION OF PRINTED DINING PLATES

CROSS REFERENCE TO RELATED APPLICATIONS

This application claims the benefit of U.S. Provisional Patent Application Ser. No. 60/438,646 Jan. 8, 2003, the entire contents of which are incorporated herein by reference.

FIELD OF THE INVENTION

Process for fabrication of printed, formed objects such as dining plates to be used for both low and high volume manufacture of high quality printed dining plates including a high quality digital image.

1. Background of the Invention

There are pieces of fine china and glass produced by hand or manual processes utilizing decals and other applied decorations that faithfully reproduce fine art, nature, and other complex images on dinnerware. This is a costly process resulting in a high priced consumer product. However, the application of this high quality work to a mass-produced product has previously met with limited success. Because of the high volume output required to achieve cost effectiveness, only low quality graphics have been successfully applied to such a product.

2. Summary of the Invention

In accordance with the invention, a methodology is provided that involves a variety of processes utilizing digital technology. This methodology produces unique dinnerware products and containers, formed of both disposable plastics and papers, and more permanent/semi-permanent material, including plastic, papers and other similar materials. As a result of the printing process in accordance with the invention, containers, plates, bowls, utensils and cups can be manufactured at high volumes while having photo-quality graphics or near photo-quality graphics as the decorative designs. This level of graphics, photo to near photo quality will herein be referred to as high quality graphics. High quality, digitally produced graphics allow for broader ranges of design and decoration of dinnerware or containers than is seen in the market today. The invention therefore defines a process that combines a number of steps in the production of higher volume dinnerware decorated with crisp clear images. The steps employed in production will vary with the substrate in use, glass, paper, pulp, plastic, polymers or other substrates, ceramic, china, metal or other materials.

In accordance with the invention to produce a low volume of high quality products, fabrication procedures tested by the inventors of the present invention to date have produced high quality printing. This process includes digital artwork generation, digital color separation and printing, sheet fed thermoforming and hand die cutting. In order to produce product at a higher output level, the inventors of the present invention have set forth in this application a process for large volume production. Either of the proposed processes will properly operate for low or high volume manufacturing, but one or the other may be more cost effective based upon various issues. Factors of cost will determine which way is best to proceed. Although both processes begin with the generation of digital photography or artwork, the digital printing process utilized in the low volume fabrication is also preferably included as one possible way to print high volume product according to a high volume manufacturing printing process. Due to the rate at which technology and changes are occurring within the digital printing industry, the low volume procedure noted above may make economic sense at some point in the future.

In the remainder of this application, the word "plates" will mean the plate used to print the "image" that will later become the "product" such as a printed dining plate, container, bowl, or utensil, during the thermoforming and die cutting process.

Still other objects and advantages of the invention will in part be obvious and will in part be apparent from the specification and the drawings.

The invention accordingly comprises the several steps and the relation of one or more of such steps with respect to each of the others, and the apparatus embodying features of construction, combination(s) of elements and arrangement of parts that are adapted to effect such steps, all as exemplified in the following detailed disclosure and claims.

BRIEF DESCRIPTION OF THE DRAWINGS

For a more complete understanding of the invention, reference is made to the following description and accompanying drawings, in which.

DETAILED DESCRIPTION OF THE PREFERRED EMBODIMENTS

Figure 1:
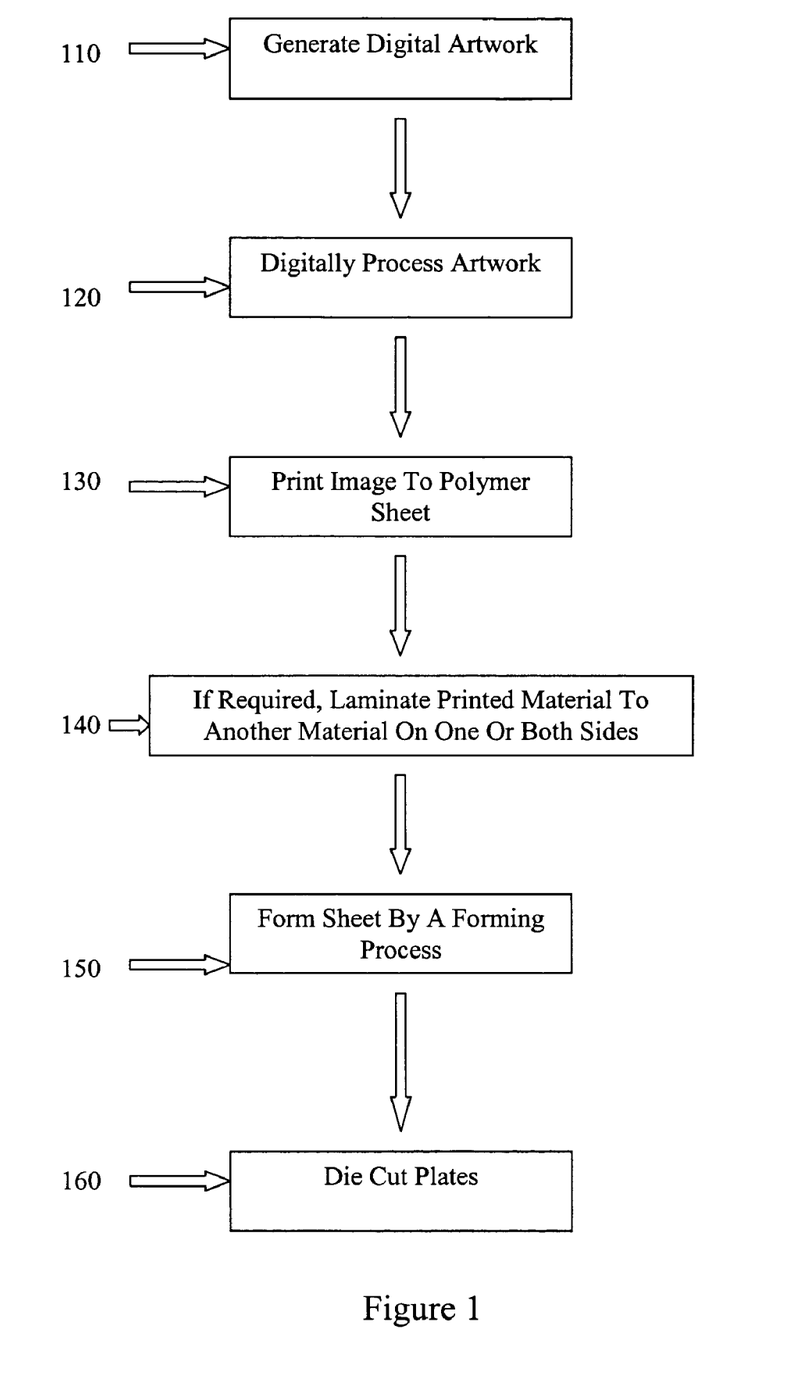
FIG. 1 is a flowchart depicting low-volume production (and potentially a high volume production based on particular cost structures) in accordance with an embodiment of the invention.
Figure 2A:
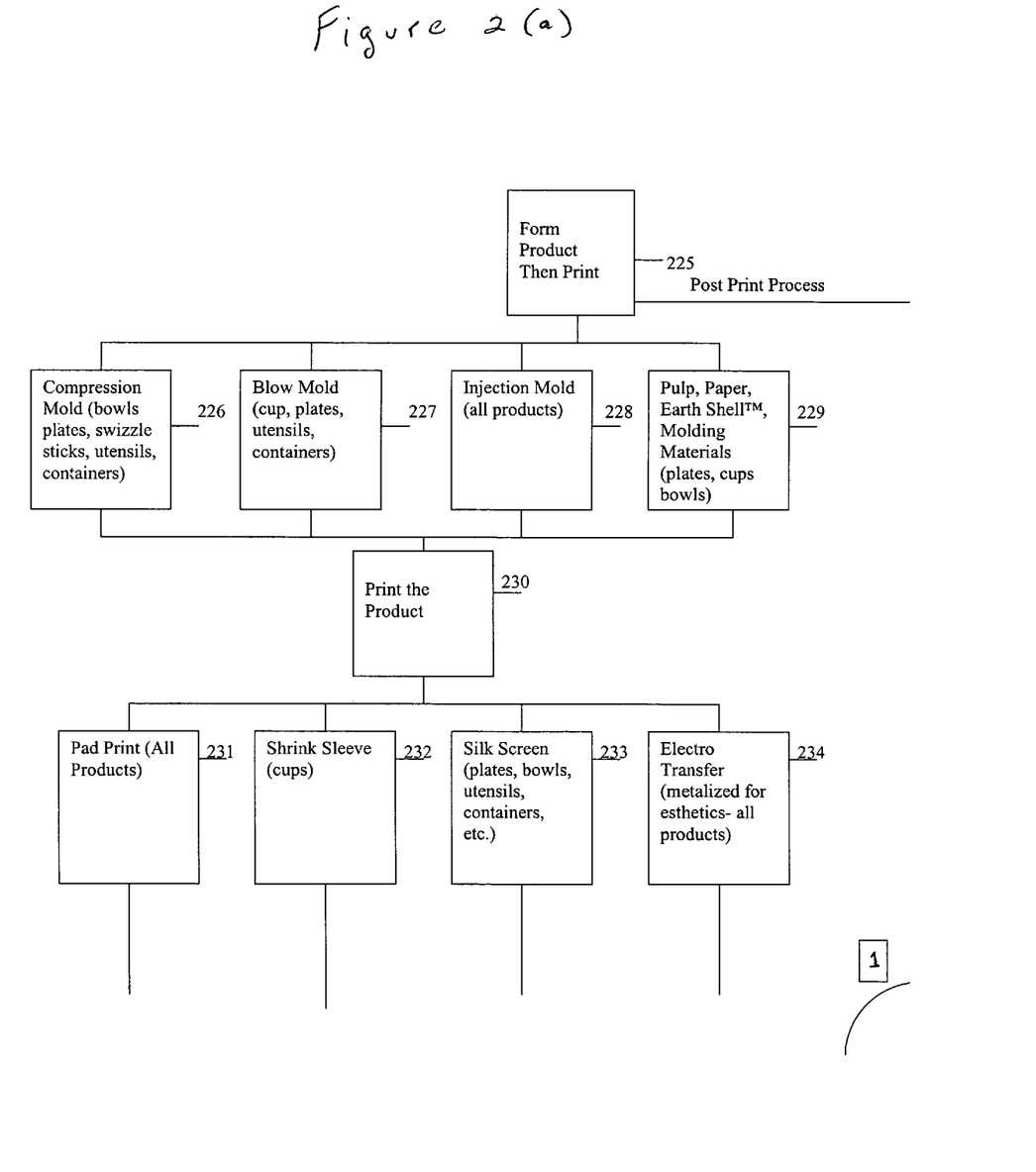
FIGS. 2(a)–(d), when properly pieced together, depict a single flowchart diagram describing the high volume high quality printing process in accordance with an additional embodiment of the invention.
Figure 2B:
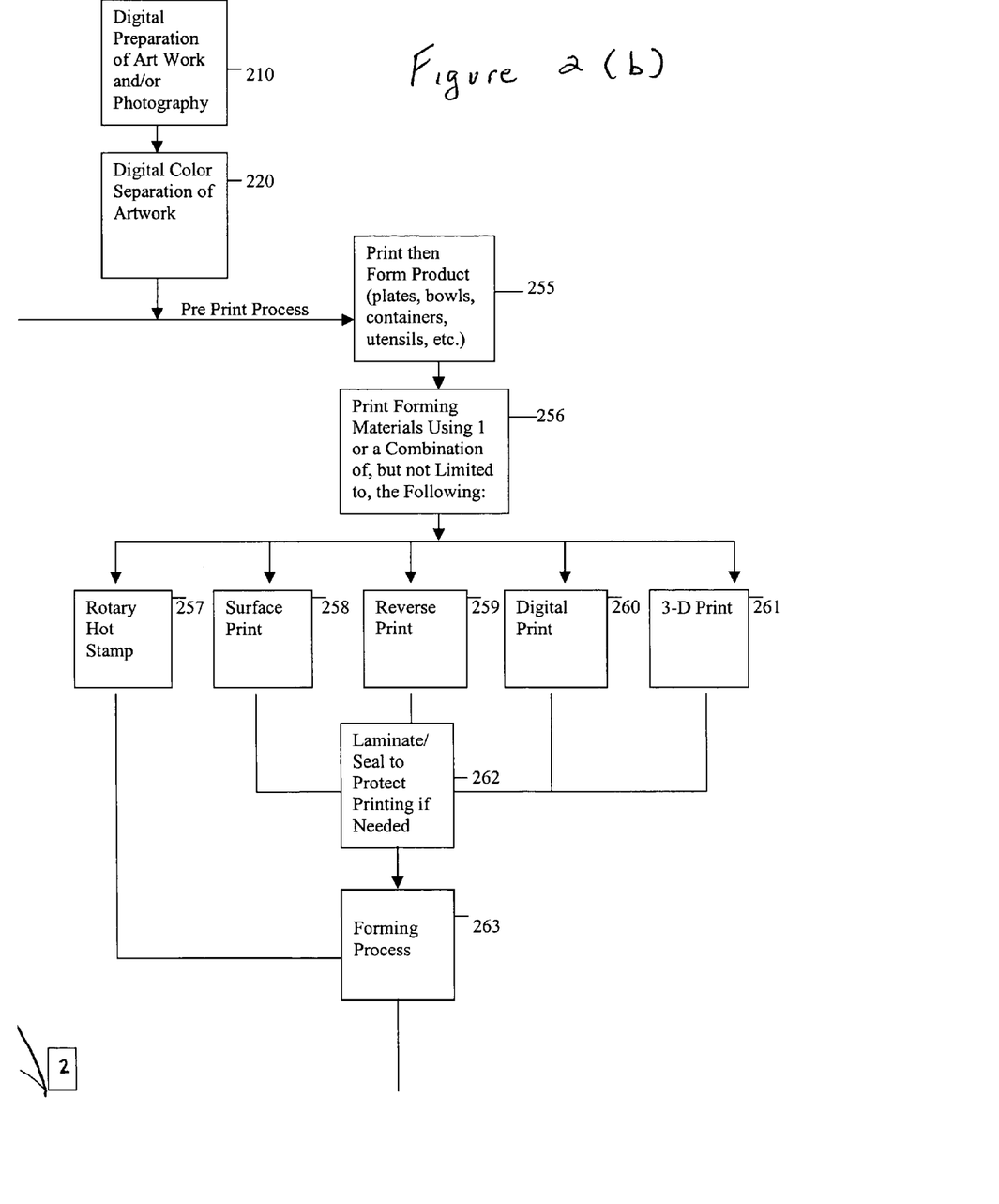
Figure 2C:
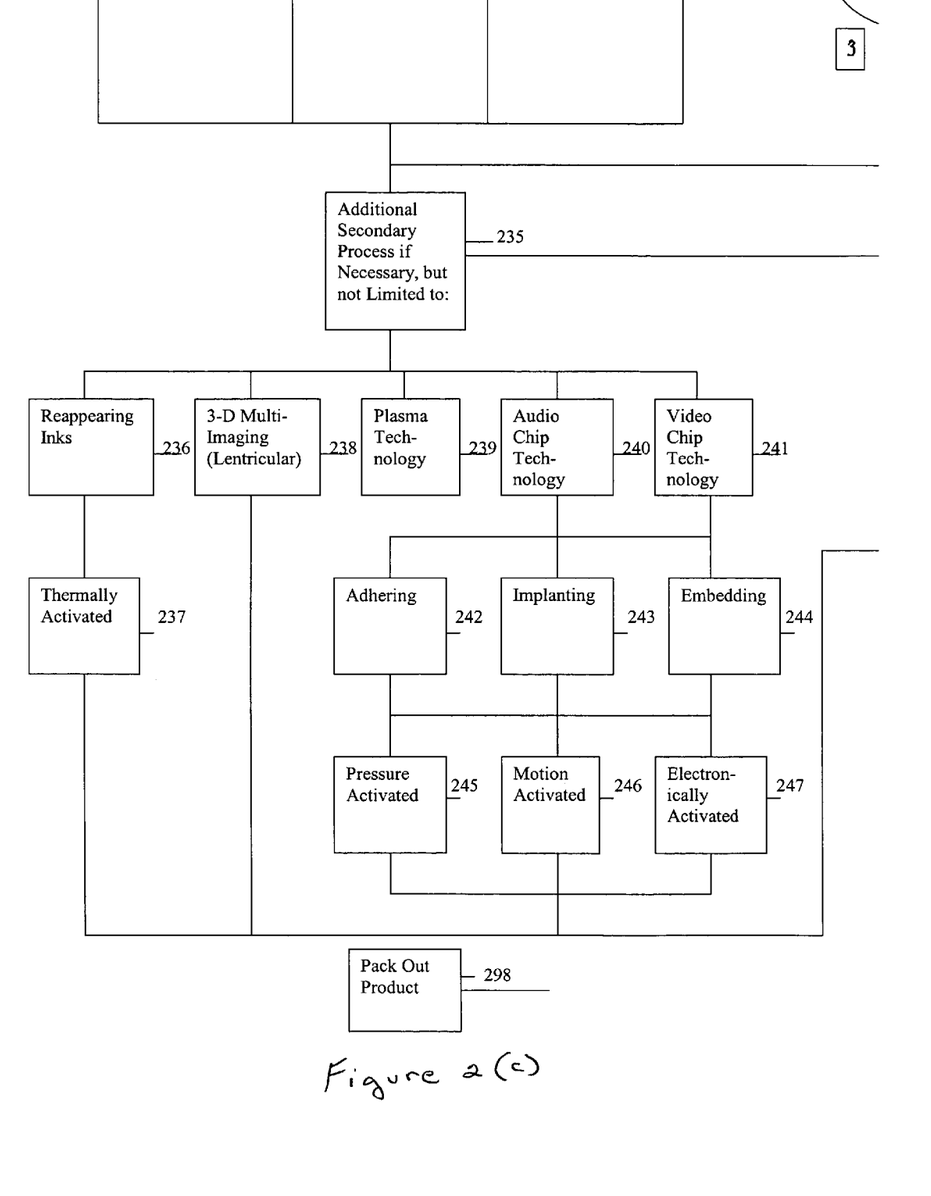
Figure 2D:
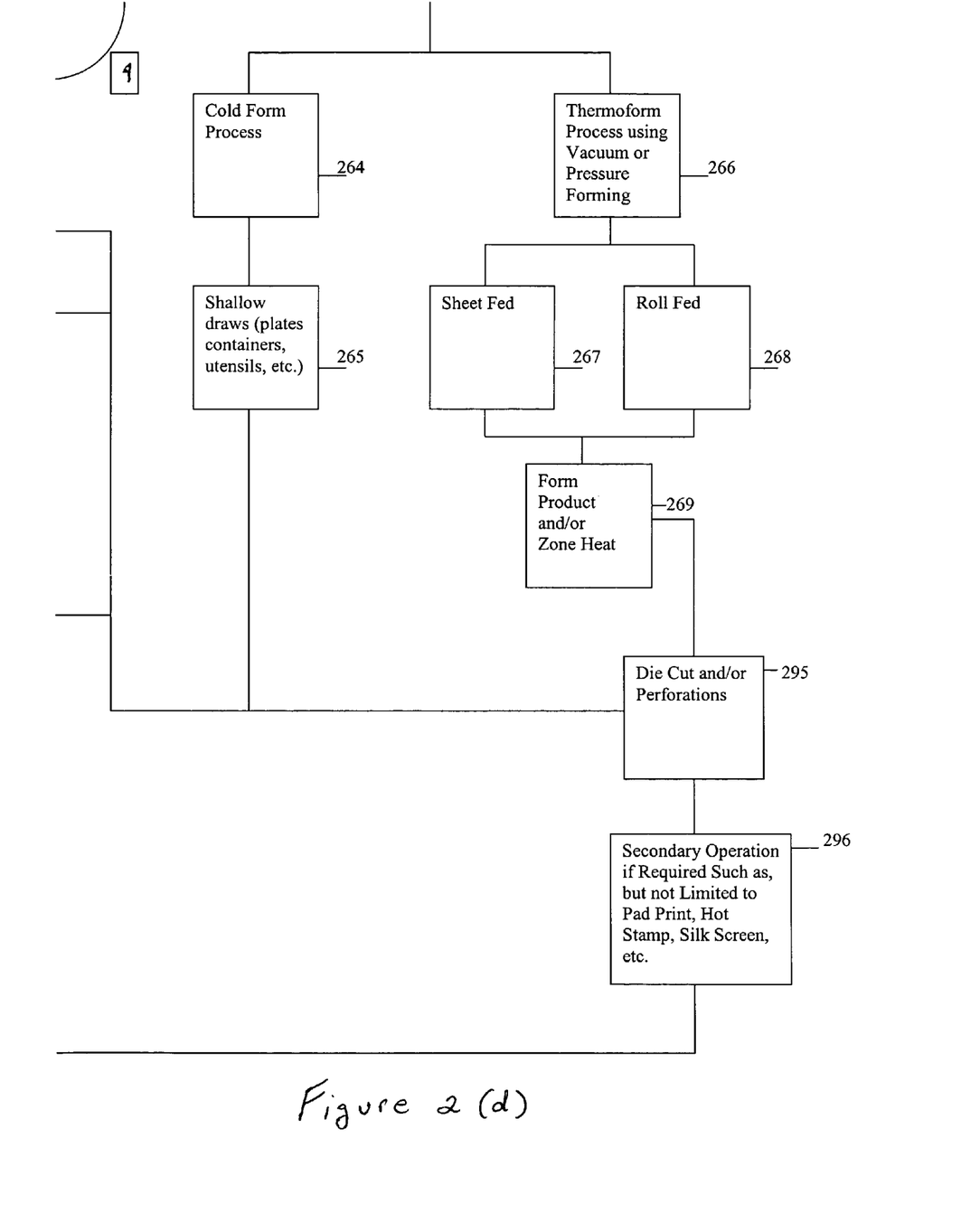

In a Low Volume Fabrication (and possible high volume in the future based on cost) process in accordance with a first embodiment of the invention is described. The printing process in accordance with the invention is shown at FIG. 1, and begins with the generation of digital artwork based on the creative and intended needs of the market(s) targeted at step 110. The basis of this artwork may be photography, artist rendition or other means of obtaining the digital image or images. At step 120 the artwork is digitally processed and broken into the individual colors, color separated, based on the primary colors, to be blended during the printing process to create the full range of shades required for each graphic. (This and the following description of resolution is equally applicable to all of the embodiments of the invention).

This processing includes the ability if needed, for pre-distorting the image to be printed on the plate so that upon distortion at forming stage, the image comes back into undistorted view. The need for distortion can vary with the plate or container shape among other things. Thus, upon the various drawing processes for forming the plates that would normally deform an image, the pre-distorted image is drawn into focus.

Typically, the level of quality of the finished, photo quality or near photo quality printed image is based on a combination of dots per square inch (DPI) used to print in the digital printing process or other printing processes and line screen in the flexographic, gravure, litho offset printing processes or other processes. The inventors of the present invention have determined that the DPI, or line screen should substantially match that with which the image was initially generated. If the artwork was prepared using 300 DPI, it is optimal that the artwork should be processed at 300

DPI. The same applies in flexographic printing and line screens of the later embodiments. To simply change the DPI, or line screen, in hopes of obtaining higher quality output, at this point, will result in less clarity, unless the image is digitally modified to the higher DPI, or line screen, format prior to color separation. Most important though is an understanding that different images require different DPI and line screen to achieve a photographic quality or near photographic quality image. For example, an image of a "smiley face" will require a lower DPI and lower line screen to achieve photographic quality than an image of a wedding bouquet. This is because the intricate details of an image, such as a wedding bouquet, will benefit from the additional resolution. It is for this reason, that minimum or maximum dpi and line screen values cannot be stated universally. Rather the measurement of high quality graphics is based on whether the reproduced image obtains photographic or near photographic characteristics.

Next, at step 130, the image is preferably printed on a clear, white or light colored polymer or other appropriate substrate. To prepare the printed matter for the thermoforming procedure, and to create the brilliant high gloss finish on the surface, at step 140 the printed sheet is preferably laminated to a clear sheet of thin clear film on each side thereof, front and back (although lamination of one side only of the printed sheet may be performed). Various types and thicknesses of the material to be printed may also be employed. This procedure may be used for any material product and has the added benefit of keeping printing ink away from any food or the like that might be placed on the finished product, because the ink is disposed on the underside of the polymer sheet in the final product. Of course, it is not necessary to always print on a polymer and always laminate the layers into a sandwich.

For example, another print process would include printing a reversed image on a single plastic film that is then adhered or laminated to the plate, utensil or container material before it is formed. The process of printing a thin film and laminating or adhering this film to the formable material (polymer, paper, pulp, Earth Shell™, or other opaque material) allows flexibility due to printing a common material (film) and attaching this film to a more difficult printing material (forming material) that allows the final product to be printed in an easier fashion. Additionally, the printed thin film material would protect the ink from contact with food or beverages (printed on the underside or reverse) and also enhance a better finish and add strength to the forming material.

The sheet is now ready for a forming process. In accordance with the invention, this forming process is preferably executed employing a temperature controlled forming process, as is shown at step 150. Greater control of the quality of the lamination is realized by varying temperatures across the mold. Various combinations of pressure and temperature may be employed to control faults in lamination, such as bubbling on the surface of the plate, and to insure against deformation of the printed image. This temperature control also results in the application of a technique known as "cold forming" to certain selected portions of the dining plate. Though cold forming is often the culprit of poor quality and generally considered a problem in the thermoforming process, it may be employed advantageously in this procedure in accordance with the invention to overcome a problem of "bubbling" on the surface of the dining plate. The material(s) used to form the dining plate may be too sensitive to the higher temperatures typically required to form a plate. Lower temperatures may be used, and the application of additional pressure is used to compensate for the reduced temperature. By using such a temperature controlled forming process the material is allowed to flow and form properly in the center of the plate as required, while the flange of the plate is left intact without exposure to heat that would have had a negative effect on the flange area.

After forming, plates are then die cut with a steel rule die as shown at step 160. Any desired perforations may be included on the overall radius-cutting die. The radius may also be cut with one die and any desired perforations formed with a secondary die to increase flexibility.

In accordance with an additional embodiment of the invention, a high quality printed, formed, die cut, stacked and packaged, ready for shipment product may be produced in high volume as well. The flowchart diagram shown in FIGS. 2(*a*)–(*d*) depict such a high volume printing process in accordance with a further embodiment of the invention. The four pages should be placed together so that a complete circle including the numbers 1, 2, 3 and 4 is formed.

As is shown in the flowchart of FIGS. 2(*a*)–2(*d*), at step 210 the digitally produced art work is generated and a digital color separation process is performed at step 220. This art work may be generated via artist or computer rendition and/or photography, but is not limited to these means of production. Thereafter, two processes may be provided. The first is to form the product and then print the graphics thereon, for example, on plates, bowls, cups, swizzle sticks, containers, utensils and the like shown beginning at step 225. The second process, to print the images first and then to form the product, is shown beginning at step 255. This process may be employed for plates and bowls and the like.

The first process beginning at step 225, of forming the product first and then printing the images may employ one of four forming processes, depending on the product type. These include compression mold (step 226) for bowls, plates, swizzle sticks, utensils; blow mold (step 227) for cups and plates; injection molding (step 228) for all products; and pulp, paper, Earth Shell™, molding (such as pressure molding) (step 229) for plates, bowls and cups. The process utilized is based upon the raw material used to form the product. At step 230, the images are then printed.

The printing process in accordance with a high volume embodiment of the invention shown at step 230 will now be described. In accordance with this high speed printing embodiment of the invention, the high quality graphics are preferably not printed digitally by means of a cartridge of primary ink colors (but may be if desired). Rather, the graphics are printed with, but not limited to a high speed printing process such as flexography, roto gravure, lithography or off set printing. The graphics may comprise any images, including but not limited to advertising couponing, and conversation generating phrases.

The high volume process utilizes or can utilize reverse printing on the clear material as shown at step 230. The material used can vary, and have different thicknesses and may include, but is not limited to; Polyvinyl Chloride (PVC), Polystyrene (PS), High Impact Polystyrene (HIPS), Polyester (Pet), Glycol Polyester (PetG), Glycol Amorphous Glycol Polyester (GAG Pet), or other suitable polymer materials all of which must be FDA approved for contact with food. The process may also use a thin film and laminating or adhering this film to the formable material (polymer, paper, pulp, Earth Shell™, or other post pulp or opaque material). It allows flexibility due to printing a common material (film) and attaching this film to a more difficult printing material (forming material) that allows the final product to be printed in an easier fashion. And, the printed thin film material would protect the ink from contact with food or beverages (printed on the underside or reverse), thereby protecting the food from the ink and the ink from any degradation from contact with the food or beverage, and also enhance a better finish and add strength to the forming material.

The preferred method of thermoforming proposed for the larger volume requirements (previously described at step 225) is called roll fed. The material to be used to form the product is supplied in roll form to the machine and pulled through the process by a series of grips grabbing each side of the material web as it passes through the machinery. Unlike the sheet fed process of thermoforming, this process is fluid and can run at much higher speeds, depending on the configuration of the form and material used.

It is, however, important that the mold and printing plates are matched with respect to dimensions in both X and Y bar orientation so that after forming, the printed material is properly applied.

The basic process of forming and adhering the printed material to the previously formed product is the same as in the low volume process. A specific amount of heat and pressure are applied to the material for a specific period of time at predetermined portions of each of the plates These parameters will vary based on which material is used.

The invention also contemplates, for high volumes, the integration an extrusion process that creates the sheet of plastic from raw resin in-line (rather than in roll form) to present to the printing process and subsequently directed straight into the thermoforming, die cutting and packaging process. Processing speeds of each sub process may vary and require additional machinery to compensate in order to keep a fluid flow of material moving.

Furthermore, Earthshell™, Biomax™ or other substrate material may be used as the substrate to form the product. For Earthshell the printing process used is the same as for the other materials except that rather than employing a thermoforming process, a pressure forming or molding process may be used. Biomax would require the lamination of the printed material after forming.

The inks used are designed to be manipulated in a forming process, as the substrate it is printed on will be heated, stretched and formed into a dining plate or other object, for example. Because of the varying requirements for each image and product to be printed, no one ink is preferred. Rather, the inks must remain pliable, not crack, and be able to be stretched at the temperatures and/or pressures required for each application, while retaining an appropriate color density and integrity after processing. In a reverse printing process the image is printed in reverse or as a mirror image on the underside of the material. There is therefore no ink contact with the food surface of the dining plate or container. The food surface is the FDA approved clear material. In addition to insuring FDA compliance to food contact, this printing process creates a high gloss finish on the face surface of the dining plate. The final printing plate may also include an FDA approved sealer to seal the final layer of print ink. It may also create a higher gloss finish to the back of the dining plate in conjunction with some graphic and material combinations. And, by using an FDA approved inks, finishes or sealers, the issue of nesting—where the sealing material comes in contact with the food surface of the plate below—is avoided. The application of FDA-approved finishes or sealers may also be utilized in the surface printing process in which the image is printed as it will be viewed on the top surface of the material. Post-printed product may be considered surface printed as well.

The printing process employed is known as "process printing" and requires a printing plate to first be etched for each of the primary colors. Thereafter, based on the graphics and requirements of the image to be printed, these etched colors may be augmented with certain solid colors better obtained through dedicated printing plates. The blending is performed in accordance with a series of dots, measured in "dots per square inch" (DPI, as discussed in the low volume printing process), and etched appropriately on each plate in accordance with the digitalized computer image. If thermoforming or other high heat technique is to be the molding method of choice, these inks can have properties that allow them to resist cracking and image distortion when the high temperatures of thermoforming are applied. Each plate applies a specific amount of required color to the substrate. The ink is then immediately cured. The result is a full color, process, blended image very similar to that obtained by the digital computer style printing process which results in a photo or near photo quality image.

The digital printing process utilized in the fabrication of the low speed product may, at some point in the future, be integrated into the in-line manufacturing process if economies of scale permit.

In addition, the printing process may employ Pad printing (step 231), shrink sleeve printing (step 234), silk screening (step 233) or Electro transfer (step 234).

After printing, any number of secondary processes may be employed to enhance the final product at step 235. These include the application of reappearing inks (step 236), that may be thermally activated step (237), 3-D imaging (step 238), or the use of various plasma technology for treatment (step 239).

An audio chip (step 240) or a video chip (step 241) may also be fixed to each of the eventual products. These are preferably fixed by employing adhering (step 242), Implanting (step 243) or embedding (step 244). Each of the audio or video chips may also be activated by pressure (step 245), motion (step 246), or electronically (step 247) by other means.

The die cutting at step 295 for large volume production is performed in line.

At step 298 the products are packed out. The stacks of plates will be automatically bagged, boxed, labeled and placed on a skid for shipment. Special handling to avoid scratching or otherwise damaging the high-quality graphics may also be employed. Referring back to step 255 of the flowchart, if the product is to be printed and then formed, first the printing materials are printed (step 256), such as by a pad print (step 257), surface print (step 258), reverse print (step 259) as described above with respect to step 230, digital print (step 260), or 3-D print (step 261). The printed material is then laminated to a raw material to be used to form the product at step 262. However, in a pad print, laminating is not performed because such a pad print does not require the protection of a laminate if food grade inks are utilized on plates, containers or objects that come in contact with food, drink or other substances taken orally. Furthermore, it is contemplated that the material upon which the image is to be printed is the raw material. In such a case, the laminate step 262 may not be necessary. A sealer may be applied on the ink to seal the ink.

Specifically, for large volumes, it is possible, to integrate an extrusion process that creates the sheet of plastic from raw resin in-line (rather than in roll form) to present to the printing process and subsequently directed straight into the thermoforming, die cutting and packaging process. Thus, the image is printed on the resin, which is directly formed into plates, other dinnerware, containers, or utensils. A sealer may be applied on ink to seal the ink.

Thereafter, the laminated materials (or unlaminated pad or other printed material) moves through a forming process at step 263. This forming process may include a cold form process (step 264) including products with shallow draws such as plates (step 265), or may include a thermoform process (step 266) such as a sheet fed low volume procedure (step 267) or a roll stock fed high volume procedure (step 268) noted above with respect to the sheet fed procedure, and including varying the temperature and pressure across any mold, and thus the product that is used. Next, the product is formed through zoned heating (step 269) as described above so that certain areas may be more appropriately heated to give the desired result, without affecting the graphics. Thereafter die cut and perforations are provided at step 295, any required secondary operations, such as personalization of the product may be provided in step 296, and the product is packed out at step 298. During packing, special handling may be provided in order to ensure the quality of the high quality graphics.

Therefore, the processes as described in accordance with the invention may be included to implement the process described above, and includes additional elements such as the embedding of various audio and video chip technology and provides a more complete picture of the forming process.

It will thus be seen that the objects set forth above, among those made apparent from the preceding description, are efficiently attained and, because certain changes may be made in carrying out the above method and in the construction(s) set forth without departing from the spirit and scope of the invention, it is intended that all matter contained in the above description and shown in the accompanying drawings shall be interpreted as illustrative and not in a limiting sense.

It is also to be understood that the above description is intended to cover all of the generic and specific features of the invention herein described and all statements of the scope of the invention which, as a matter of language, might be said to fall therebetween.

We claim:

1. A method of fabricating a formed object, comprising the steps of:
    printing a desired high quality photo or near photo like image on a forming material at a resolution substantially equal to the resolution of an original digital image used to form the high quality image; and
    forming the formed object by a forming process in which the temperature and pressure across the object are varied, wherein the varying of the temperature across the object results in at least one portion of the object being cold formed, and wherein additional pressure is applied to the at least one portion of the object being cold formed.

2. The method of claim 1, wherein a higher temperature is used at a portion of the object requiring a large draw, and a lower temperature is used at a portion of the object requiring a smaller draw.

3. The method of claim 1, wherein the image is pre-distorted across the object to reduce final visual distortion of the image when the object is formed.

4. The method of claim 1, wherein a clear laminate is adhered to the forming material so that an ink used to print the image on the forming material is sandwiched between the laminate and the forming material.

5. The method of claim 1, wherein the desired image is printed to the forming material by a reverse printing process.

6. The method of claim 5, wherein a sealer is applied to the forming material to seal the ink for fabricating the formed object.

7. A method of fabrication of a plate which uses digital technology to produce high quality, multicolor process printed graphics on the plate, comprising the steps of:
    printing a desired high quality photo or near photo like image on a forming material to be used to form the plate at a resolution substantially equal to the resolution of an original digital image used to form the high quality image; and
    forming the plate by a forming process in which the temperature across the plate is varied, wherein the varying of the temperature across the plate results in at least one portion of the plate being cold formed, and wherein additional pressure is applied to the portions of the plate being cold formed.

8. The method of claim 7, wherein a higher temperature is used toward the middle of the plate, while a lower temperature is used around the lip of the plate during the thermoforming process.

9. The method of claim 8, wherein the image is pre-distorted in the vicinity of the plate inside the lip, so that the area requiring the greatest draw is controlled to reduce distortion of the image.

10. The method of claim 7, wherein a clear laminate is adhered to the forming material used to form the plate so that an ink used to print the image on the forming material is sandwiched between the laminate and the forming material.

11. The method of claim 7, wherein the image is printed on the forming material by a reverse printing process.

12. The method of claim 11, wherein a sealer is applied to the forming material to seal the ink.

13. The method of claim 7, wherein the forming material is extruded.

14. The method of claim 7, wherein the image is printed on the forming material by a flexographic process.

15. The method of claim 7, wherein the cold forming process aids in controlling the quality of the plate.

16. A method of fabricating a plate, comprising the steps of:
    pre-distorting a high quality image; printing the pre-distorted desired image on a forming material at a resolution substantially equal to the resolution of an original digital image used to form the high quality image; and
    forming the plate by a forming process in which a higher temperature and pressure are applied at a center of the plate and a lower temperature and pressure are applied to the lip of the plate so that the resulting image appears undistorted.

17. The method of claim 16, wherein the plate is die cut from the forming material after forming.

18. The method of claim 16, wherein a clear laminate is adhered to the forming material used to form the plate.

19. A method of fabricating a formed object, comprising the steps of:
    reverse printing a desired high quality photo or near photo like image on a thin film at a resolution substantially equal to the resolution of an original digital image used to form the high quality image; adhering the printed thin film to a forming material; and
    forming the formed object by a forming process in which the temperature and pressure across the object are varied, wherein the varying of the temperature across the object results in at least one portion of the object being cold formed, and wherein additional pressure is applied to the at least one portion of the object being cold formed.

20. The method of claim 19, wherein a higher temperature is used at a portion of the object requiring a large draw, and a lower temperature is used at a portion of the object requiring a smaller draw.

21. The method of claim 19, wherein the image is pre-distorted across the object to reduce final visual distortion of the image when the object is formed.

22. The method of claim 19, wherein the forming material is formed by a cold forming process.

23. The method of claim 19, further comprising the step of selecting one or more inks to be printed on the thin film so that the inks stretch and do not crack during forming.

24. The method of claim 19, further comprising the step of selecting one or more inks to be printed on the thin film so that the inks retain their color density during forming.

* * * * *